US007867309B2

(12) United States Patent
Suzuta et al.

(10) Patent No.: US 7,867,309 B2
(45) Date of Patent: Jan. 11, 2011

(54) STEAM-WATER SEPARATOR

(75) Inventors: Tadahiko Suzuta, Hyogo (JP); Yoshiyuki Kondo, Hyogo (JP); Toshiyuki Mizutani, Hyogo (JP); Kengo Shimamura, Hyogo (JP); Naoaki Hirota, Hyogo (JP); Yosuke Katsura, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 506 days.

(21) Appl. No.: 11/990,293

(22) PCT Filed: Feb. 20, 2007

(86) PCT No.: PCT/JP2007/053019

§ 371 (c)(1),
(2), (4) Date: Feb. 11, 2008

(87) PCT Pub. No.: WO2007/099811

PCT Pub. Date: Sep. 7, 2007

(65) Prior Publication Data

US 2009/0120297 A1 May 14, 2009

(30) Foreign Application Priority Data

Feb. 28, 2006 (JP) ............................ 2006-053631

(51) Int. Cl.
*B01D 45/12* (2006.01)

(52) U.S. Cl. .................................. 55/457; 55/DIG. 23

(58) Field of Classification Search .................. 55/447, 55/457, DIG. 23
See application file for complete search history.

(56) References Cited

U.S. PATENT DOCUMENTS

| | | | | |
|---|---|---|---|---|
| 4,769,050 | A | 9/1988 | Shaw et al. | |
| 5,963,611 | A * | 10/1999 | Narabayashi et al. | ....... 376/371 |
| 2003/0185334 | A1 | 10/2003 | Fujii et al. | |

FOREIGN PATENT DOCUMENTS

| | | | |
|---|---|---|---|
| JP | 5-256989 | A | 10/1993 |
| JP | 2001-79323 | A | 3/2001 |
| JP | 2001-183489 | A | 7/2001 |
| JP | 2002-143619 | A | 5/2002 |
| JP | 2002143620 | A * | 5/2002 |
| JP | 2003-307584 | A | 10/2003 |
| JP | 2004-3932 | A | 1/2004 |
| TW | 594793 | B | 6/2004 |

OTHER PUBLICATIONS

International Search Report of PCT/JP2007/053019, date of mailing Mar. 23, 2007.
Taiwanese Office Action dated Sep. 20, 2010, issued in corresponding Taiwanese Patent Application No. 096106758.

* cited by examiner

*Primary Examiner*—Robert A Hopkins
(74) *Attorney, Agent, or Firm*—Westerman, Hattori, Daniels & Adrian, LLP

(57) ABSTRACT

In a steam-water separator, horizontal slits are formed on the outer side of the curving direction of the curved part and at a location between the curved part of the riser and the swirl vane.

9 Claims, 12 Drawing Sheets

STEAM-WATER SEPARATOR

TECHNICAL FIELD

The present invention relates to a steam-water separator that separates a two-phase flow of steam and liquid into the steam and the liquid.

BACKGROUND ART

For example, a pressurized water reactor (PWR: Pressurized Water Reactor), using light water as a reactor coolant and a neutron moderator, runs it as non-boiling, high-temperature and high-pressure water throughout a reactor core, sends the high-temperature and high-pressure water to a steam generator for generation of steam by heat exchange, and sends the steam to a turbine generator for generation of electricity. The pressurized water reactor transfers the heat of high-temperature and high-pressure primary cooling water to secondary cooling water by way of the steam generator, generating the steam from the secondary cooling water. In the steam generator, the primary cooling water flows inside a large number of narrow heat-transfer tubes, and the heat of the primary cooling water is transferred to the secondary cooling water flowing outside the heat-transfer tubes, thereby generating the steam, which causes the turbine to rotate for generating electricity.

In the steam generator, a tube bank external cylinder is arranged inside the sealed hollow barrel with a predetermined space from the inner wall thereof, a plurality of heat-transfer tubes of an inverted U shape are arranged inside the tube bank external cylinder, with each heat-transfer tube having its end supported by a tube support and its middle part supported by a plurality of tube supporting plates that are supported by stay-rods extending from the tube support, and a steam-water separator and a humidity separator are arranged in the upper part.

Therefore, when the primary cooling water is supplied to the plurality of heat-transfer tubes through a water chamber provided at the lower part of the barrel, and the secondary cooling water is supplied into the barrel from a water supply pipe provided at the upper part of the barrel, the heat exchange is performed between the primary cooling water (hot water) flowing inside the plurality of heat-transfer tubes and the secondary cooling water (cold water) circulating inside the barrel, so that the secondary cooling water absorbs the heat and the steam is generated. When the steam goes upward, the water is separated from the steam, and the steam is discharged from the upper end of the barrel while the water falls downward.

A conventional steam-water separator consists of a plurality of risers through which the steam goes upward, a swirl vane provided inside the riser, a downcomer barrel located outside the riser to form a downcomer space, and a deck plate having an orifice and a vent that is arranged opposite the upper end of the riser and the downcomer barrel with a predetermined space therefrom.

Therefore, two-phase flow of the steam and the water generated by the steam generator is introduced into each riser at its lower end, moving upward, and is lifted upward while whirling by the swirl vane, and the water deposits on the inner wall face of the riser and moves upward while becoming a liquid film flow and the steam moves upward while whirling at the upper part of the riser. The steam is delivered above the deck plate mainly through the orifice and the vent, and the water escapes out of the riser through an opening between the upper end of the riser and the deck plate, flowing into the downcomer barrel and then flows downward. Accordingly, only the steam flows out above the deck plate.

This type of steam-water separator is described in the Patent Documents 1 and 2 below.

Patent document 1: Japanese Patent Application Laid-Open No. 2001-079323

Patent document 2: Japanese Patent Application Laid-Open No. 2001-183489

DISCLOSURE OF INVENTION

Problem to be Solved by the Invention

Incidentally, in the steam generator described above, in terms of layout, a riser at the circumferential side in a steam-water separator needs to be formed into a curve. FIGS. 11 and 12 are schematic diagrams of a conventional steam-water separator. In the conventional steam-water separator, as shown in FIG. 11, a riser 001 through which the steam goes upward is formed with a vertical part 003 jointed to the upper end of a curved part 002 and has a swirl vane 004 fixed inside. A downcomer barrel 005 for forming a downcomer space is provided outside the riser 001, and a deck plate 008 having an orifice 006 and a vent 007 is provided above the riser 001 and the downcomer barrel 005.

In the conventional steam-water separator, while a two-phase flow of the steam and the water goes upward inside the riser 001, the curved part 002 provided at the lower part of the riser 001 causes imbalance to the stream of the two-phase flow, and liquid drops of the two-phase flow come in contact with the outer side of the curving direction at the curved part 002, forming a liquid film there. While the two-phase flow is lifted upward swirling by the swirl vane 004, the liquid film grows, and the liquid film on the outer side of the curving direction at the curved part 002 becomes thicker than that on the inner side of the curving direction at the curved part 002, at the upper end of the riser 001.

Then, a whirling flow of the separated steam comes in contact with the liquid film to come to contain a large quantity of liquid drops, and the liquid film with such liquid drops contained is discharged above the deck plate. The steam containing a large quantity of liquid drops causes a lack of processing capacity of a humidity separator, resulting in a problem that appropriately separated steam of good quality can not be generated. There is also a problem that while most of the water flowing from the upper end of the riser 001 to the downcomer barrel 005 goes downward in the downcomer barrel 005, due to some of the liquid film becoming thick, some of the water overflows above the orifice 006 or overflows out of the downcomer barrel 005.

Furthermore, as shown in FIG. 12, an imbalance is caused to a flow speed of the two-phase flow as well because of the curved part 002 provided at the lower part of the riser 001, which causes the thickness of the liquid film to differ between the outer side and the inner side of the curving direction at the curved part 002 at the upper end of the riser 001. Therefore, there is a problem that carryover increases due to an increase in the flow speed of the steam discharged through the orifice 006 and the vent 007.

The present invention is intended to solve the problems mentioned above, and an object of the present invention is to provide a steam-water separator aimed at enhancing steam-water separating efficiency by making the thickness of a liquid film formed inside a sweat-water riser even and by preventing an overflow of a liquid film flow.

Means for Solving Problem

In order to achieve the above objects, the steam-water separator according to the invention of claim 1 includes a steam-water riser pipe which includes a curved part at a lower part and through which a two-phase flow of water and steam goes up; a swirl vane provided inside the steam-water riser pipe; a downcomer barrel provided surrounding the steam-water riser pipe to form an annular downcomer space; a deck plate that is arranged opposite upper ends of the steam-water riser pipe and the downcomer barrel with a predetermined space therefrom and that includes an orifice arranged above the steam-water riser pipe; and a liquid film adjusting unit that adjusts a thickness of a liquid film formed on an inner face of the steam-water riser pipe.

In the steam-water separator according to the invention of claim 2, the liquid film adjusting unit includes a liquid film flow discharging member arranged on an outer side of a curving direction of the curved part and at a location between the curved part and the swirl vane in the steam-water riser pipe.

In the steam-water separator according to the invention of claim 3, the liquid film adjusting unit includes a liquid film flow passage that guides the liquid film formed on an outer side of a curving direction of the curved part to an inner side of the curving direction and arranged at a location between the curved part and the swirl vane in the steam-water riser pipe.

In the steam-water separator according to the invention of claim 4, the liquid film flow passage is provided spirally outside the steam-water riser pipe.

In the steam-water separator according to the invention of claim 5, the liquid film adjusting unit includes a liquid film flow discharging member arranged on an outer side of a curving direction of the curved part and at a location above the swirl vane in the steam-water riser pipe.

In the steam-water separator according to the invention of claim 6, the liquid film adjusting unit includes a resistance plate arranged at a location between the curved part and the swirl vane in the steam-water riser pipe and in which a two-phase flow passage is formed at a center thereof.

In the steam-water separator according to the invention of claim 7, the liquid film adjusting unit includes a liquid film flow discharging member provided at an upper end part of the steam-water riser pipe, and an area of opening of the liquid film flow discharging member on an outer side of a curving direction of the curved part is set larger than an area of opening on an inner side of the curving direction of the curved part.

In the steam-water separator according to the invention of claim 8, the orifice is provided at a position decentered relative to the steam-water riser pipe toward an inner side of the curving direction of the curved part.

The steam-water separator according to the invention of claim 9 includes a steam-water riser pipe which includes a curved part at a lower part and through which a two-phase flow of water and steam goes up; a swirl vane provided inside the steam-water riser pipe; a downcomer barrel provided surrounding the steam-water riser pipe to form an annular downcomer space; and a deck plate that is arranged opposite the upper ends of the steam-water riser pipe and the downcomer barrel with a predetermined space therefrom and that includes an orifice above the steam-water riser pipe, wherein the orifice is arranged at a position decentered relative to the steam-water riser pipe toward an inner side of a curving direction of the curved part.

EFFECT OF THE INVENTION

According to the steam-water separator of the invention of claim 1, the steam-water riser pipe which has the curved part at its lower part and through which the two-phase flow of the water and steam flows upward is provided, the swirl vane is provided inside the steam-water riser pipe, the water downcomer barrel is provided to form the annular downcomer space around the steam-water riser pipe, the deck plate having the orifice over the steam-water riser pipe is arranged opposite the upper end of the steam-water riser pipe and the water downcomer barrel with the predetermined space therefrom, and the liquid film adjusting unit that adjusts the thickness of the liquid film formed on the inner face of the steam-water riser pipe is provided. The two-phase flow of the water and the steam that is introduced into the steam-water riser pipe at its lower end flows upward and then is lifted upward whirling by the swirl vane, and the water deposits on the inner face of the steam-water riser pipe and is lifted upward while becoming the liquid film flow. At this moment, because the liquid film flows up with its thickness being adjusted by the liquid film adjusting unit, the water, without overflowing, appropriately flows into the downcomer space of the water downcomer barrel and flows down. On the other hand, the steam flows up while whirling at the upper part of the steam-water riser pipe, and is appropriately discharged above the deck plate through the orifice without absorbing the water of the liquid film. As a result, by making the thickness of the liquid film formed inside the steam-water riser pipe even and preventing the overflow of the liquid film flow, the steam-water separating efficiency can be enhanced.

According to the steam-water separator of the invention of claim 2, by implementing the liquid film adjusting unit by forming the liquid film flow discharging unit on the outer side of the curving direction of the curved part at the location between the curved part and the swirl vane in the steam-water riser pipe, although the two-phase flow of the water and the steam that is introduced into the steam-water riser pipe at its lower end and flows upward comes in contact with the outer side of the curving direction of the curved part and forms the liquid film there, because some of the liquid film flow is discharged through the liquid film flow discharging unit, the liquid film flows upward without increasing its thickness. Therefore, the overflow of the water and the absorption of the water of the liquid film into the steam are eliminated. Thus, the steam-water separating efficiency can be enhanced.

According to the steam-water separator of the invention of claim 3, by implementing a liquid film adjusting unit by forming the liquid film flow passage that is located between the curved part and the swirl vane in the steam-water riser pipe and guides the liquid film formed on the outer side of the curving direction of the curved part to the inner side of the curving direction, although the two-phase flow of the water and the steam that is introduced into the steam-water riser pipe at its lower end and flows upward comes in contact with the outer side of the curving direction of the curved part and forms the liquid film there, because some of the liquid film flow is guided through the liquid film flow passage to the inner side of the curving direction, the liquid film flows upward without increasing its thickness. Therefore, the overflow of the water and the absorption of the water of the liquid film into the steam are eliminated. Thus, the steam-water separating efficiency can be enhanced.

According to the steam-water separator of the invention of claim 4, with the liquid film flow passage provided spirally on the outside of the steam-water riser pipe, some liquid film flow passing through the liquid film flow passage runs spirally and is guided to the inner side of the curving direction. Therefore, the whirling power is given to the two-phase flow and all the steam upward is lifted. Thus, the steam-water separating efficiency can be enhanced.

According to the steam-water separator of the invention of claim 5, by implementing the liquid film adjusting unit by forming the liquid film flow discharging unit on the outer side of the curving direction of the curved part at the location above the swirl vane in the steam-water riser pipe, although the two-phase flow of the water and the steam that is introduced into the steam-water riser pipe at its lower end and flows upward comes in contact with the outer side of the curving direction of the curved part to form the liquid film there, and the liquid film grows as it flows upward, because some of the liquid film flow is discharged through the liquid film flow discharging unit, the overflow of the water and the absorption of the water of the liquid film into the steam are eliminated. Thus, the steam-water separating efficiency can be enhanced.

According to the steam-water separator of the invention of claim 6, by implementing the liquid film adjusting unit by providing the resistance plate, with the passage of the two-phase flow formed at its center, at the location between the curved part and the swirl vane in the steam-water riser pipe, although the two-phase flow of the water and the steam that is introduced into the steam-water riser pipe and flows upward comes in contact with the outer side of the curving direction of the curved part and forms the liquid film there, because the growth of the liquid film flow is restrained by the resistance plate, the liquid film flows upward without increasing its thickness. Therefore, the overflow of the water and the absorption of the water of the liquid film into the steam are eliminated. Thus, the steam-water separating efficiency can be enhanced.

According to the steam-water separator of the invention of claim 7, by implementing the liquid film adjusting unit by providing the liquid film flow discharging unit at the upper end of the steam-water riser pipe and setting the liquid film flow discharging unit in such manner that the opening area on the outer side of the curving direction of the curved part is larger than that on the inner side, although the two-phase flow of the water and the steam that is introduced into the steam-water riser pipe and flows upward comes in contact with the outer side of the curving direction of the curved part to form the liquid film there, and the liquid film grows as it flows upward, because the opening area of the liquid film flow discharging unit on the outer side of the curving direction of the curved part is large, and some of the liquid film flow is discharged therefrom, the overflow of the water and the absorption of the water of the liquid film into the steam are eliminated. Thus, the steam-water separating efficiency can be enhanced.

According to the steam-water separator of the invention of claim 8, with the orifice provided eccentrically, toward the inner side of the curving direction of the curved part, relative to the steam-water riser pipe, although the liquid film flow formed at the curved part goes upward, the overflow of the water through the orifice can be prevented due to the orifice being eccentrically provided.

According to the steam-water separator of the invention of claim 9, the steam-water riser pipe which has the curved part at its lower part and through which the two-phase flow of the water and steam flows upward is provided, the swirl vane is provided inside the steam-water riser pipe, the water downcomer barrel is provided to form the annular downcomer space around the steam-water riser pipe, the deck plate having the orifice over the steam-water riser pipe is arranged opposite the upper end of the steam-water riser pipe and the water downcomer barrel with the predetermined space therefrom, and the orifice is provided eccentrically, toward the inner side of the curving direction of the curved part, relative to the steam-water riser pipe. The two-phase flow of the water and the steam that is introduced into the steam-water riser pipe at its lower end flows upward and then is lifted upward whirling by the swirl vane, and the water deposits on the inner face of the steam-water riser pipe and is lifted upward while becoming the liquid film flow. However, because the orifice is eccentrically provided, the water, without overflowing, appropriately flows into the downcomer space of the water downcomer barrel and flows down. As a result, the steam-water separating efficiency can be enhanced.

EXPLANATIONS OF LETTERS OR NUMERALS

Figure 1:
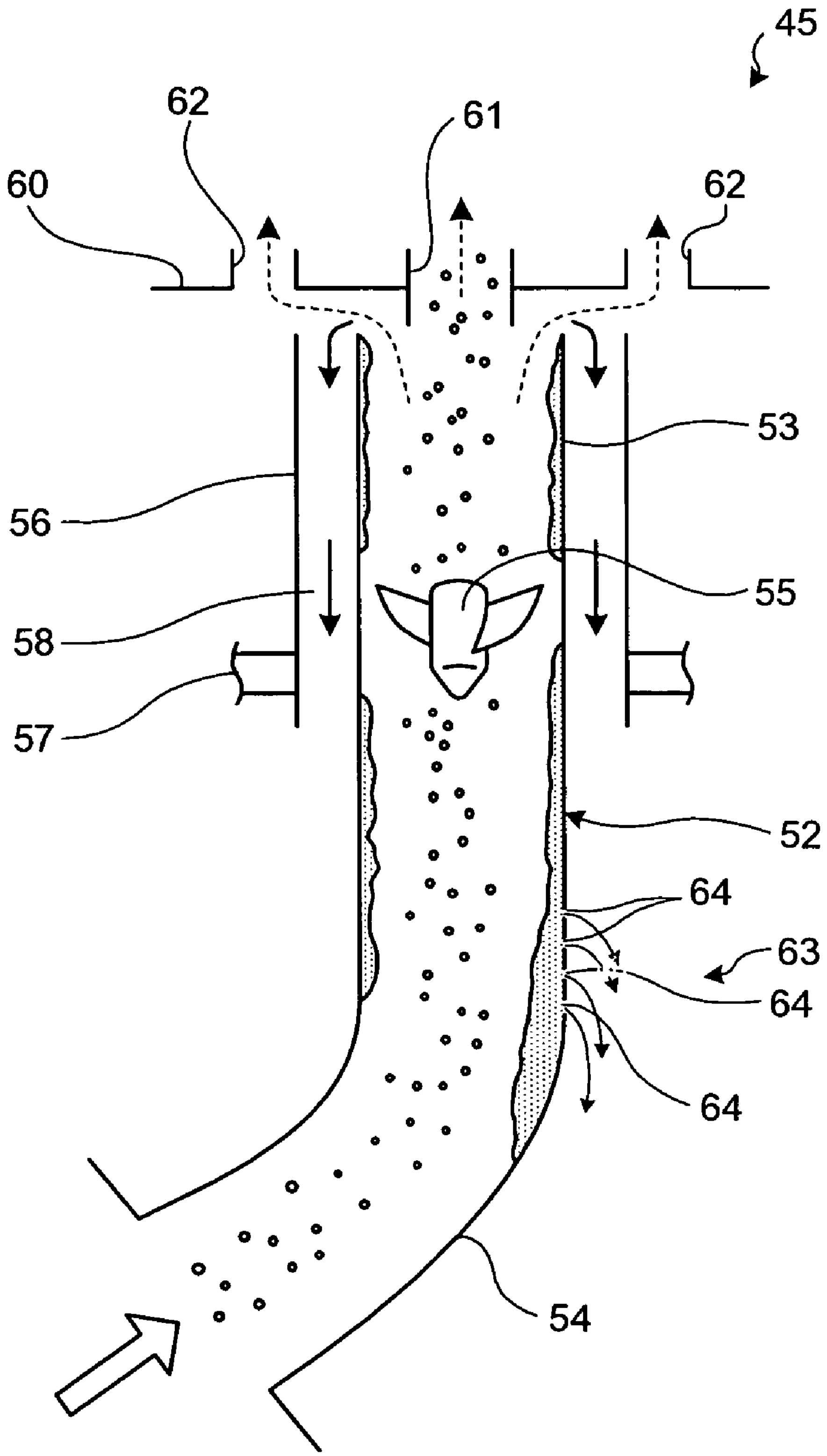
FIG. 1 is a schematic diagram of a relevant part of a steam-water separator according to a first embodiment of the present invention.

13 steam generator
31 barrel
32 tube bank external cylinder
37 heat-transfer tube
38 heat-transfer tube group
45 steam-water separator
46 humidity separator
47 water supply pipe
51, 52 riser (steam-water riser pipe)
53 vertical part

54 curved part
55 swirl vane
56 downcomer barrel (water downcomer barrel)
58 downcomer space
60 deck plate
61 orifice
62 vent
63, 81, 101, 102 liquid film flow discharging unit (liquid film adjusting unit)
64, 73, 74, 82, 103, 104 slit
71 liquid film flow passage (liquid film adjusting unit)
72 cover
92 resistance plate (liquid film adjusting unit)

BEST MODE(S) FOR CARRYING OUT THE INVENTION

In the following, exemplary embodiments of a steam-water separator according to the present invention are explained in detail with reference to accompanying drawings. The present invention is not to be limited by these embodiments.

First Embodiment

Figure 2:
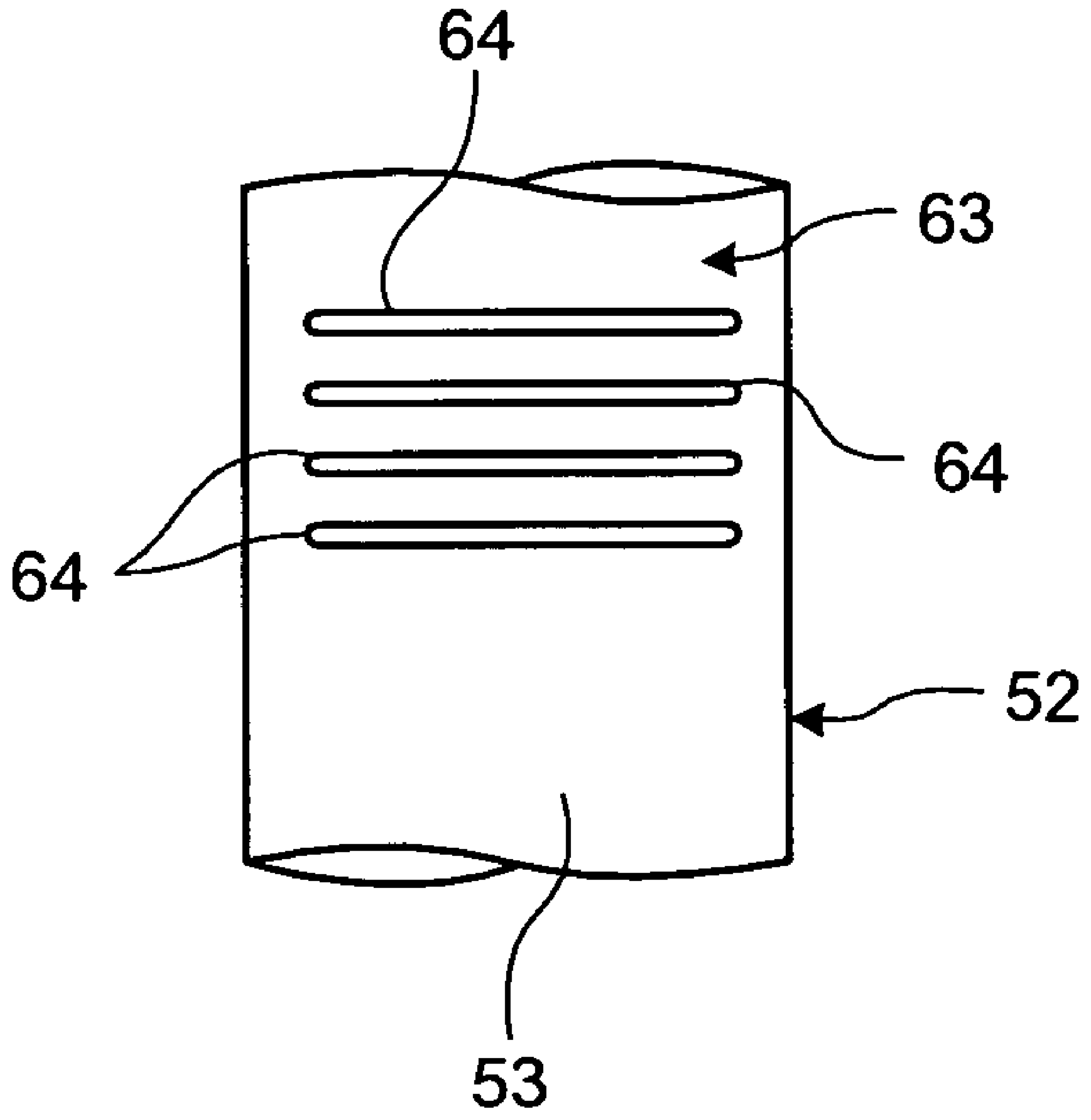
FIG. 2 is a side view of a riser in the steam-water separator of the first embodiment.
Figure 3:
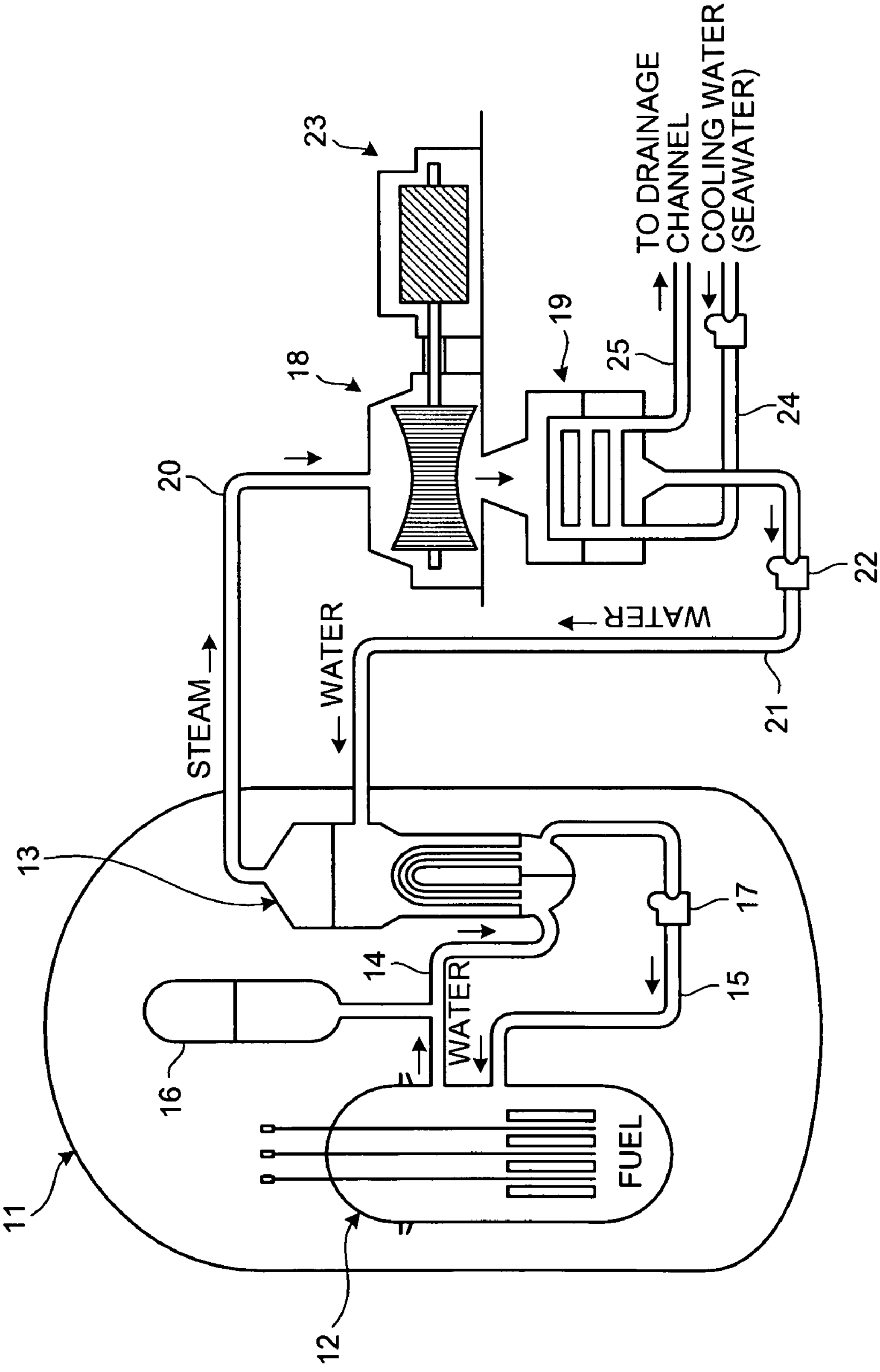
FIG. 3 is a schematic configuration diagram of electric power facilities having a pressurized water reactor to which a steam generator having the steam-water separator of the first embodiment is applied.
Figure 4:
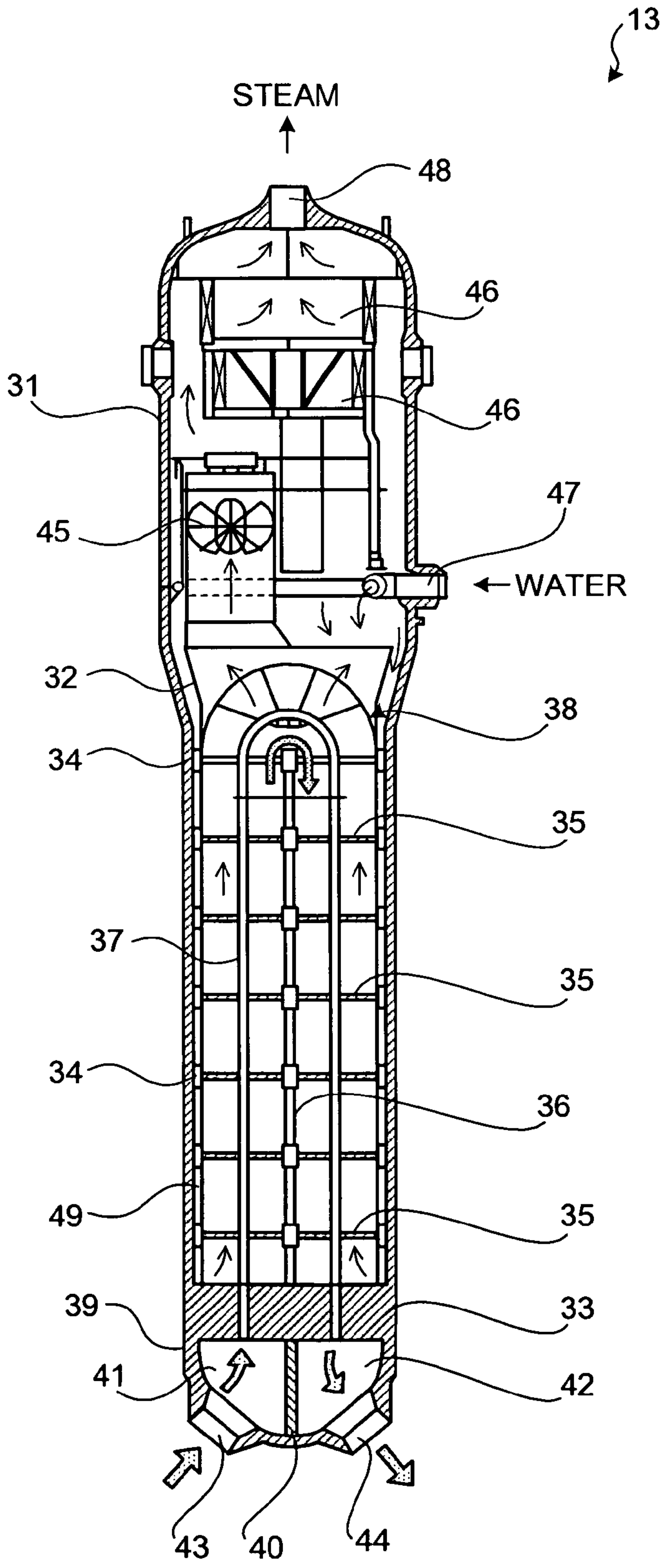
FIG. 4 is a schematic configuration diagram of the steam generator having the steam-water separator of the first embodiment.
Figure 5:
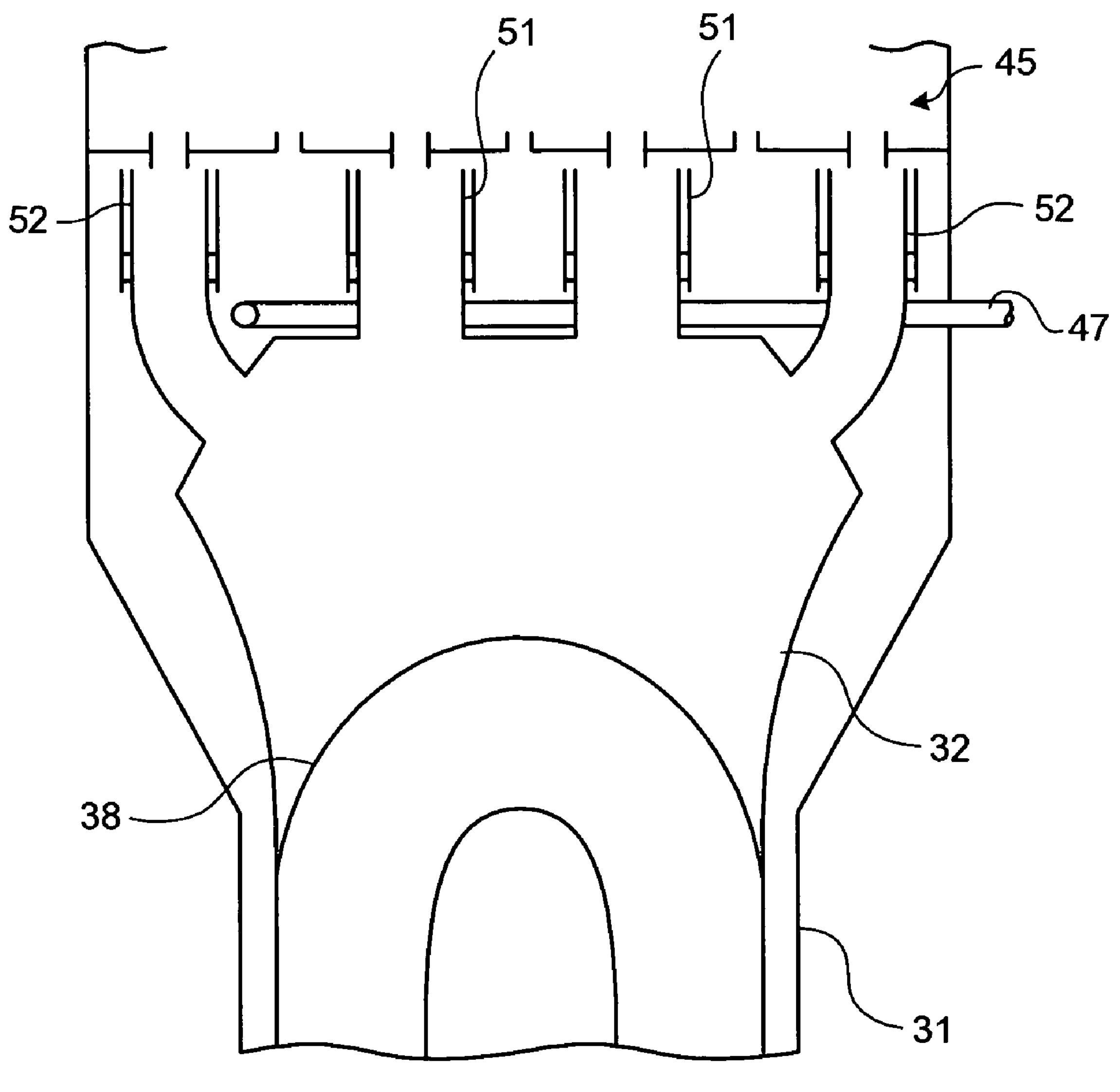
FIG. 5 is a schematic diagram of the steam-water separator of the first embodiment.

FIG. 1 is a schematic diagram of a relevant part of a steam-water separator according to a first embodiment of the present invention; FIG. 2 is a side view of a riser in the steam-water separator of the first embodiment; FIG. 3 is a schematic configuration diagram of electric power facilities having a pressurized water reactor to which a steam generator having the steam-water separator of the first embodiment is applied; FIG. 4 is a schematic configuration diagram of the steam generator having the steam-water separator of the first embodiment; and FIG. 5 is a schematic diagram of the steam-water separator of the first embodiment.

The reactor of the first embodiment is the pressurized water reactor (PWR: Pressurized Water Reactor) that, using light water as a reactor coolant and a neutron moderator, runs it as non-boiling, high-temperature and high-pressure water throughout a reactor core, sends the high-temperature and high-pressure water to the steam generator for generation of steam by heat exchange, and sends the steam to a turbine generator for generation of electricity.

Namely, in the electric power facilities having the pressurized water reactor, as shown in FIG. 3, a containment vessel 11 houses a pressurized water reactor 12 and a steam generator 13, the pressurized water reactor 12 and the steam generator 13 are connected by way of cooling water pipes 14 and 15, and the cooling water pipe 14 is provided with a pressurizer 16, and the cooling water pipe 15 is provided with a cooling water pump 17. In this case, the light water is used as moderator and primary cooling water and a primary cooling system is given a high pressure on the order of 150 to 160 atmospheres by the pressurizer 16 to restrain boiling of the primary cooling water at the reactor core. Therefore, in the pressurized water reactor 12, the light water as primary cooling water is heated by low enriched uranium or MOX as fuel, and the light water at high temperature is sent to the steam generator 13 through the cooling water pipe 14 while maintained at predetermined high pressure by the pressurizer 16. At the steam generator 13, heat exchange is made between the light water at high pressure and high temperature and the water as secondary cooling water, and the light water cooled down is sent back to the pressurized water reactor 12 through the cooling water pipe 15.

The steam generator 13 is connected to a turbine 18 and a condenser 19 provided outside the containment vessel 11 by way of cooling water pipes 20 and 21, and the cooling water pipe 21 is provided with a feed pump 22. The turbine 18 is connected to an electric generator 23, and the condenser 19 is connected to a supply pipe 24 and a drain pipe 25 that supply and drain the cooling water (for example, sea water). Therefore, the steam generated by the heat exchange with the high-pressure and high-temperature light water at the steam generator 13 is sent to the turbine 18 through the cooling water pipe 20, and the steam drives the turbine 18, so that the electric generator 23 generates electricity. The steam, after driving the turbine 18, is cooled down by the condenser 19 and then is sent back to the steam generator 13 through the cooling water pipe 21.

In the steam generator 13 in the electric power facilities having the pressurized water reactor, as shown in FIG. 4, a barrel 31 is sealed, has a hollow cylindrical shape, and has a diameter somewhat smaller at the lower part than at the upper part. Inside the barrel 31, a tube bank external cylinder 32 of a cylindrical shape is arranged with a predetermined space from the inner wall of the barrel 31, and its lower end is extended up to the vicinity of a tube plate 33. The tube bank external cylinder 32 is supported by a plurality of supporting members 34 at a position with predetermined distances from the barrel 31 in a longitudinal direction and a circumferential direction.

In the tube bank external cylinder 32, a plurality of tube supporting plates 35 are arranged at the heights corresponding to those of the supporting members 34 and are supported by a plurality of stay-rods 36 extending upward from the tube plate 33. Inside the tube bank external cylinder 32, a heat-transfer tube group 38 including a plurality of heat-transfer tubes 37 of an inverted U shape is arranged. Each heat-transfer tube 37 has its end expanded and supported by the tube plate 33 and its middle part supported by the plurality of tube supporting plates 35. In this case, the tube supporting plate 35 has a large number of through holes (not shown) formed, and each heat-transfer tube 37 runs through the through hole in a non-contact state.

A water chamber 39 is fixed to the lower end of the barrel 31. The water chamber 39 is divided inside into an incoming chamber 41 and an outgoing chamber 42 by a bulkhead 40, and includes an inlet nozzle 43 and an outlet nozzle 44. Each heat-transfer tube 37 has one end connected to the incoming chamber 41 and the other end connected to the outgoing chamber 42. The cooling water pipe 14 is connected to the inlet nozzle 43, while the cooling water pipe 15 is connected to the outlet nozzle 44.

A steam-water separator 45 that separates supplied water into steam and hot water and a humidity separator 46 that removes humidity from thus separated steam to bring it to a state close to a dry steam are provided at the upper part of the barrel 31. At the barrel 31, a water supply pipe 47 for supplying the secondary cooling water inside the barrel 31 is inserted between the heat-transfer tube group 38 and the steam-water separator 45, and a steam outlet 48 is formed at the ceiling of the barrel 31. A water supply channel 49 is provided inside the barrel 31, along which the secondary cooling water supplied from the water supply pipe 47 into the barrel 31 flows down between the barrel 31 and the tube bank external cylinder 32, circulates upward at the tube plate 33, and runs upward inside the heat-transfer tube group 38, thereby performing the heat exchange with the hot water (primary cooling water) flowing inside each heat-transfer tube 37. The cooling water pipe 21 is connected to the water supply pipe 47, while the cooling water pipe 20 is connected to the steam outlet 48.

Therefore, the primary cooling water heated by the pressurized water reactor 12 is sent to the incoming chamber 41 of the steam generator 13 through the cooling water pipe 14, circulates through a large number of heat-transfer tubes 37, and flows to the outgoing chamber 42. On the other hand, the secondary cooling water cooled by the condenser 19 is sent to the water supply pipe 47 of the steam generator 13 through the cooling water pipe 21 and runs through the water supply channel 49, performing the heat exchange with the hot water (primary cooling water) flowing in the heat-transfer tubes 37. Namely, inside the barrel 31, the heat exchange is performed between the high-pressure, high-temperature primary cooling water and the secondary cooling water, and the cooled primary cooling water is sent from the outgoing chamber 42 back to the pressurized water reactor 12 through the cooling water pipe 15. On the other hand, the secondary cooling water that has performed the heat exchange with the high-pressure and high-temperature primary cooling water goes upward inside the barrel 31 and is separated by the steam-water separator 45 into the steam and the hot water, and the steam is sent to the turbine 18 through the cooling water pipe 20 after its humidity is removed by the humidity separator 46.

At the steam-water separator 45 of the steam generator 13 configured as described above, as shown in FIG. 5, a plurality of risers (steam-water riser pipes) 51 of a vertical shape located at the center and the risers (steam-water riser pipes) 52 of a curved shape located at the periphery are provided at the upper part of the tube bank external cylinder 32. Namely, a working space is required for a welding work and the like by a worker at the time of production, between the riser 52 located at the periphery of the tube bank external cylinder 32 and the barrel 31, and the lower end of the riser 52 located at the periphery of the tube bank external cylinder 32 needs to have a curved shape.

However, in the steam-water separator having the curve-shaped riser 52, when a two-phase flow of the steam and the hot water goes upward inside the riser 52, an imbalance is caused to the stream of the two-phase flow, and liquid drops of the two-phase flow come in contact with the inner face of the curved part, forming a comparatively thick liquid film there. When the two-phase flow is lifted upward while swirling, the liquid film generated grows, and an imbalance is caused to the thickness of the liquid film at the upper end of the riser 52. Then, a whirling flow of the separated steam, by coming in contact with the liquid film, comes to contain a large quantity of liquid drops, so that the steam-water separating efficiency is lowered. Moreover, because the liquid film becomes thick at the upper end of the riser 52, some of the hot water, together with the steam, overflows upward.

Therefore, in the present embodiment, the riser 52 into which the two-phase flow of the steam and the hot water is introduced is provided with a liquid film adjusting unit that adjusts the thickness of the liquid film formed on its inner face.

Namely, in the steam-water separator 45 of the present embodiment, as shown in FIGS. 1 and 5, the riser 52 is configured so that the curved part 54 is integrally jointed to the lower part of the vertical part 53 by welding or the like, and the lower end thereof is jointed to the tube bank external cylinder 32, enabling the two-phase flow of the steam and the hot water to be introduced from below the curved part 54. The riser 52 has a swirl vane (whirling vane) 55 fixed inside the vertical part 53, capable of giving a whirling power to the two-phase flow. By providing a downcomer barrel (water downcomer barrel) 56 outside the vertical part 53 of the riser 52 to surround the riser 52, and supporting the downcomer barrel 56 by the stay 57 to the tube bank external cylinder 32, an annular downcomer space 58 is formed between the riser 52 and the downcomer barrel 56.

A deck plate 60 is provided above the riser 52 and the downcomer barrel 56 with a predetermined space therefrom, with its circumferential part being supported by the tube bank external cylinder 32. On the deck plate 60, an orifice 61 is formed above and opposite the riser 52, and a plurality of vents 62 are formed adjacent to the orifice 61.

The riser 52 has a liquid film flow discharging unit 63 formed, as a liquid film adjusting unit, on the vertical part 53 on the outer side of the curving direction of the curved part 54, at the location between the curved part 54 and the swirl vane 55. In the present embodiment, as shown in detail in FIG. 2, a plurality of slits 64 are formed, as the liquid film flow discharging unit 63, horizontally at the lower part of the vertical part 53.

The operation of the steam-water separator 45 of the present embodiment configured as described above is explained.

The two-phase flow of the steam and the hot water is introduced into the riser 52 from its lower part, flows upward by a whirling power by the swirl vane 55, and is separated into the liquid whose primary element is the hot water and the liquid whose primary element is the steam due to a difference in the whirling radius depending on a difference in mass. The low-mass liquid whose primary element is the steam flows upward inside the riser 52 while whirling with a small whirling radius centered near the central axis of the riser 52, and is discharged above the deck plate 60 through the orifice 61 and the vents 62. On the other hand, the high-mass liquid whose primary element is the hot water flows upward inside the riser 52 while whirling with a whirling radius larger than that of the liquid whose primary element is the steam, and is introduced into the downcomer space 58 of the downcomer barrel 56 through an opening between the riser 52 and the deck plate 60.

At this moment, the two-phase flow of the steam and the hot water introduced into the curved part 54 of the riser 52 comes in contact with the inner face on the outer side of the curving direction of the curved part 54, forming the liquid film there. However, because the slits 64 are formed above that place, some of the liquid film flow is discharged outside through these slits 64. Therefore, the liquid film does not increase its thickness. Namely, although the liquid film is formed on the inner face of the riser 52, the liquid film flows upward while its thickness in the circumferential direction is being adjusted to be even by the liquid film flow discharging unit 63 composed of the plurality of slits 64, so that the hot water appropriately flows into the downcomer space 58 of the downcomer barrel 56 and flows downward without overflowing through the orifice 61. On the other hand, the steam flows upward while whirling at the upper part of the riser 52 and is appropriately discharged above the deck plate 60 through the orifice 61 without absorbing water because there is no imbalance of the liquid film.

As above, in the steam-water separator of the first embodiment, the swirl vane 55 is fixed inside the riser 52 having the vertical part 53 and the curved part 54, the annular downcomer space 58 is formed by providing the downcomer barrel 56 outside the vertical part 53 of the riser 52, the deck plate 60 is arranged above the riser 52 and the downcomer barrel 56 with a predetermined space therefrom, the orifice 61 and the vents 62 are formed, and the plurality of horizontal slits 64 are formed, as the liquid film flow discharging unit 63, on the vertical part 53 on the outer side of the curving direction of the curved part 54, at the location between the curved part 54 of the riser 52 and the swirl vane 55.

Therefore, although the two-phase flow of the steam and the hot water introduced into the riser 52 comes in contact with the inner face on the outer side of the curving direction of the curved part 54 and the liquid film is formed thereon, some of the liquid film flow is discharged outside through the slits 64 of the liquid film flow discharging unit 63. Therefore, the liquid film has its thickness in the circumferential direction adjusted to be even, so that the hot water appropriately flows into the downcomer space 58 of the downcomer barrel 56 and flows downward without overflowing through the orifice 61. Moreover, there is no imbalance of the liquid film, so that the steam that flows upward while whirling at the upper part of the riser 52 is appropriately discharged above the deck plate 60 through the orifice 61 without absorbing the water. As a result, the steam-water separating efficiency can be enhanced.

In the present embodiment, the liquid film adjusting unit of the present invention is composed by forming the plurality of horizontal slits 64, as the liquid film flow discharging unit 63, on the outer side of the curving direction of the curved part 54. Therefore, it is possible to adjust the thickness of the liquid film formed on the inner face on the outer side of the curving direction of the curved part 54 with a simple configuration.

The liquid film flow discharging unit 63 as the liquid film adjusting unit can be composed of a plurality of round holes instead of the plurality of horizontal slits 64 in the above-mentioned embodiment.

Second Embodiment

Figure 6:
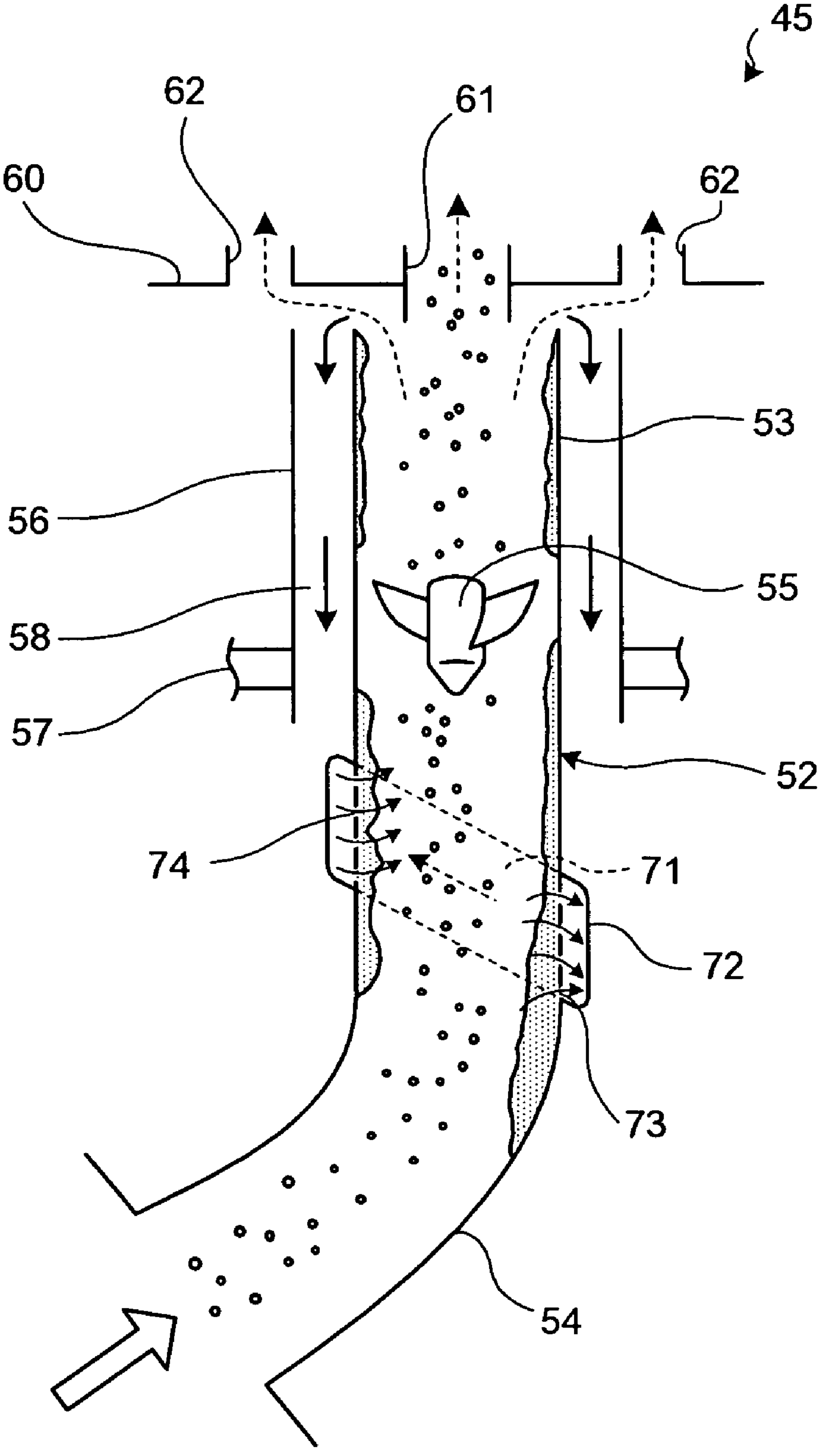
FIG. 6 is a schematic diagram of a relevant part of a steam-water separator according to a second embodiment of the present invention.

FIG. 6 is a schematic diagram of a relevant part of a steam-water separator according to a second embodiment of the present invention. The member having the same function as that of the member described in the above-mentioned embodiment is given the same reference numeral, and an explanation thereof is omitted.

In the steam-water separator 45 of the second embodiment, as shown in FIG. 6, the riser 52 is configured so that the curved part 54 is integrally jointed to the lower part of the vertical part 53, enabling the two-phase flow of the steam and the hot water to be introduced from below the curved part 54, and the riser 52 has a swirl vane 55 fixed inside the vertical part 53. By providing the downcomer barrel 56 to surround the vertical part 53 of the riser 52, the annular downcomer space 58 is formed between the riser 52 and the downcomer barrel 56. The deck plate 60 is provided above the riser 52 and the downcomer barrel 56 with a predetermined space therefrom, and the orifice 61 and the vents 62 are formed on the deck plate 60.

In the riser 52, a liquid film flow passage 71 is formed that, as the liquid film adjusting unit, guides the liquid film formed on the vertical part 53 on the outer side of the curving direction of the curved part 54 to the inner side of the curving direction, at the location between the curved part 54 and the swirl vane 55. In the present embodiment, the liquid film flow passage 71 is composed of a spiral cover 72 that is fixed outside the vertical part 53 to connect the outer side of the curving direction and the inner side of the curving direction of the curved part 54, and a plurality of lower slits 73 and a plurality of upper slits 74 that connect the space inside the cover 72 and the inside of the riser 52.

The operation of the steam-water separator 45 of the present embodiment configured as described above is explained.

The two-phase flow of the steam and the hot water is introduced into the riser 52 from its lower part, flows upward by a whirling power by the swirl vane 55, and is separated into the liquid whose primary element is the hot water and the liquid whose primary element is the steam due to a difference in the whirling radius depending on a difference in mass. The low-mass liquid whose primary element is the steam flows upward inside the riser 52 while whirling with a small whirling radius centered near the central axis of the riser 52, and is discharged above the deck plate 60 through the orifice 61 and the vents 62. On the other hand, the high-mass liquid whose primary element is the hot water flows upward inside the riser 52 while whirling with a whirling radius larger than that of the liquid whose primary element is the steam, and is introduced into the downcomer space 58 of the downcomer barrel 56 through an opening between the riser 52 and the deck plate 60.

At this moment, the two-phase flow of the steam and the hot water introduced into the curved part 54 of the riser 52 comes in contact with the inner face on the outer side of the curving direction of the curved part 54, forming the liquid film there. However, because the liquid film flow passage 71 is formed above that place from the outer side of the curving direction to the inner side of the curving direction, and some of the liquid film flow goes through the lower slits 73 into the cover 72 and is sent back into the riser 52 through the upper slits 74. Therefore, the liquid film on the vertical part 53 on the outer side of the curving direction does not increase its thickness. Namely, although the liquid film is formed on the inner face of the riser 52, some of the liquid film flow on the outer side of the curving direction runs into the inner side of the curving direction through the liquid film flow passage 71, so that the liquid film flows upward while its thickness in the circumferential direction is being adjusted to be even. Therefore, the hot water appropriately flows into the downcomer space 58 of the downcomer barrel 56 and flows downward without overflowing through the orifice 61. On the other hand, the steam flows upward while whirling at the upper part of the riser 52 and is appropriately discharged above the deck plate 60 through the orifice 61 without absorbing water because there is no imbalance of the liquid film.

As above, in the steam-water separator of the second embodiment, the swirl vane 55 is fixed inside the riser 52 having the vertical part 53 and the curved part 54, the annular downcomer space 58 is formed by providing the downcomer barrel 56 outside the vertical part 53 of the riser 52, the deck plate 60 is arranged above the riser 52 and the downcomer barrel 56 with a predetermined space therefrom, the orifice 61 and the vents 62 are formed, and the liquid film flow passage 71 is formed that guides the liquid film on the vertical part 53 on the outer side of the curving direction of the curved part 54 to the inner side of the curving direction, at the location between the curved part 54 of the riser 52 and the swirl vane 55.

Therefore, although the two-phase flow of the steam and the hot water introduced into the riser 52 comes in contact with the inner face on the outer side of the curving direction of the curved part 54 and the liquid film is formed thereon, some of the liquid film flow runs into the inner side of the curving direction through the liquid film flow passage 71. Therefore, the liquid film has its thickness in the circumferential direction adjusted to be even, so that the hot water appropriately flows into the downcomer space 58 of the downcomer barrel 56 and flows downward without overflowing through the orifice 61. Moreover, there is no imbalance of the liquid film, so that the steam that flows upward while whirling at the upper part of the riser 52 is appropriately discharged above the deck plate 60 through the orifice 61 without absorbing the water. As a result, the steam-water separating efficiency can be enhanced.

In the present embodiment, the liquid film adjusting unit of the present invention is implemented by the liquid film flow passage 71 that guides the liquid film on the vertical part 53 on the outer side of the curving direction of the curved part 54 to the inner side of the curving direction, and the liquid film flow passage 71 is composed of the spiral cover 72 that is fixed outside the vertical part 53 to connect the outer side of the curving direction and the inner side of the curving direction of the curved part 54 and the plurality of lower slits 73 and the plurality of upper slits 74 that connect the space inside the cover 72 and the inside of the riser 52. Therefore, it is possible to adjust the thickness of the liquid film formed on the inner face on the outer side of the curving direction of the curved part 54 and eliminate the discharge of the steam of the two-phase flow going upward inside the riser 52 to the outside with a simple configuration. Thus, enhanced efficiency of the steam-water separating processing can be achieved.

Third Embodiment

Figure 7:
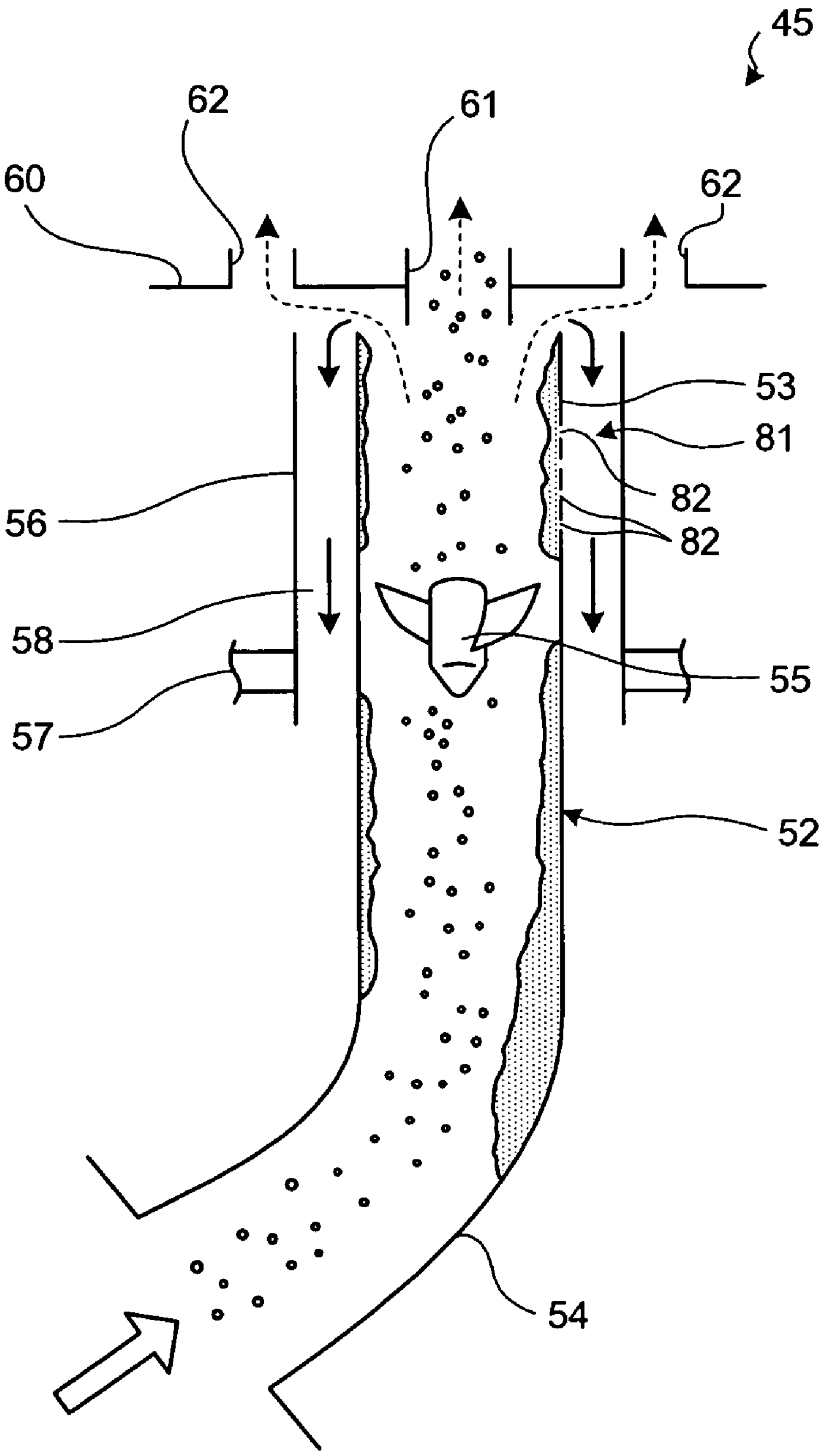
FIG. 7 is a schematic diagram of a relevant part of a steam-water separator according to a third embodiment of the present invention.

FIG. 7 is a schematic diagram of a relevant part of a steam-water separator according to a third embodiment of the present invention. The member having the same function as that of the member described in the above-mentioned embodiments is given the same reference numeral, and an explanation thereof is omitted.

In the steam-water separator 45 of the third embodiment, as shown in FIG. 7, the riser 52 is configured so that the curved part 54 is integrally jointed to the lower part of the vertical part 53, enabling the two-phase flow of the steam and the hot water to be introduced from below the curved part 54, and the riser 52 has the swirl vane 55 fixed inside the vertical part 53. By providing the downcomer barrel 56 to surround the vertical part 53 of the riser 52, the annular downcomer space 58 is formed between the riser 52 and the downcomer barrel 56. The deck plate 60 is provided above the riser 52 and the downcomer barrel 56 with a predetermined space therefrom, and the orifice 61 and the vents 62 are formed on the deck plate 60.

The riser 52 has a liquid film flow discharging unit 81 formed, as a liquid film adjusting unit, on the vertical part 53 on the outer side of the curving direction of the curved part 54, at the location above the swirl vane 55. In the present embodiment, a plurality of slits 82 are formed, as the liquid film flow discharging unit 81, horizontally at the upper end of the vertical part 53.

The operation of the steam-water separator 45 of the present embodiment configured as described above is explained.

The two-phase flow of the steam and the hot water is introduced into the riser 52 from its lower part, flows upward by a whirling power by the swirl vane 55, and is separated into the liquid whose primary element is the hot water and the liquid whose primary element is the steam due to a difference in the whirling radius depending on a difference in mass. The low-mass liquid whose primary element is the steam flows upward inside the riser 52 while whirling with a small whirling radius centered near the central axis of the riser 52, and is discharged above the deck plate 60 through the orifice 61 and the vents 62. On the other hand, the high-mass liquid whose primary element is the hot water flows upward inside the riser 52 while whirling with a whirling radius larger than that of the liquid whose primary element is the steam, and is introduced into the downcomer space 58 of the downcomer barrel 56 through an opening between the riser 52 and the deck plate 60.

At this moment, the two-phase flow of the steam and the hot water introduced into the curved part 54 of the riser 52 comes in contact with the inner face on the outer side of the curving direction of the curved part 54, forming the liquid film there. Although the liquid film flows upward while its thickness grows even after given a whirling power by the swirl vane 55, because the slits 82 are formed on the upper part of the vertical part 53, some of the liquid film flow is discharged outside through the slits 82. Therefore, the liquid film does not increase its thickness. Namely, although the liquid film is formed on the inner face of the riser 52, the thickness of the liquid film in the circumferential direction is adjusted to be even by the liquid film flow discharging unit 81 composed of the plurality of slits 82, so that the hot water appropriately flows into the downcomer space 58 of the downcomer barrel 56 and flows downward without overflowing through the orifice 61. On the other hand, the steam flows upward while whirling at the upper part of the riser 52 and is appropriately discharged above the deck plate 60 through the orifice 61 without absorbing the water because there is no imbalance of the liquid film.

As above, in the steam-water separator of the third embodiment, the swirl vane 55 is fixed inside the riser 52 having the vertical part 53 and the curved part 54, the annular downcomer space 58 is formed by providing the downcomer barrel 56 outside the vertical part 53 of the riser 52, the deck plate 60 is arranged above the riser 52 and the downcomer barrel 56 with a predetermined space therefrom, the orifice 61 and the vents 62 are formed, and the plurality of horizontal slits 82 are formed, as the liquid film flow discharging unit 81, on the upper part of the vertical part 53 on the outer side of the curving direction of the curved part 54, at the location above the swirl vane 55 in the riser 52.

Therefore, although the two-phase flow of the steam and the hot water introduced into the riser 52 comes in contact with the inner face on the outer side of the curving direction of the curved part 54 to form the liquid film thereon, and the liquid film formed flows upward up to the vertical part 53 while growing, some of the liquid film flow is discharged outside through the slits 82 of the liquid film flow discharging unit 81. Therefore, the liquid film has its thickness in the circumferential direction at the upper part of the riser 52 adjusted to be even, so that the hot water appropriately flows into the downcomer space 58 of the downcomer barrel 56 and flows downward without overflowing through the orifice 61. Moreover, there is no imbalance of the liquid film, so that the steam that flows upward while whirling at the upper part of the riser 52 is appropriately discharged above the deck plate 60 through the orifice 61 without absorbing the water. As a result, the steam-water separating efficiency can be enhanced.

In the present embodiment, the liquid film adjusting unit of the present invention is composed by forming the plurality of horizontal slits 82, as the liquid film flow discharging unit 81, on the vertical part 53 on the outer side of the curving direction of the curved part 54. Therefore, it is possible to adjust the thickness of the liquid film formed on the inner face on the outer side of the curving direction of the curved part 54 with a simple configuration.

The liquid film flow discharging unit 81 as the liquid film adjusting unit can be composed of a plurality of round holes instead of the plurality of horizontal slits 82 in the above-mentioned embodiment.

Fourth Embodiment

Figure 8:
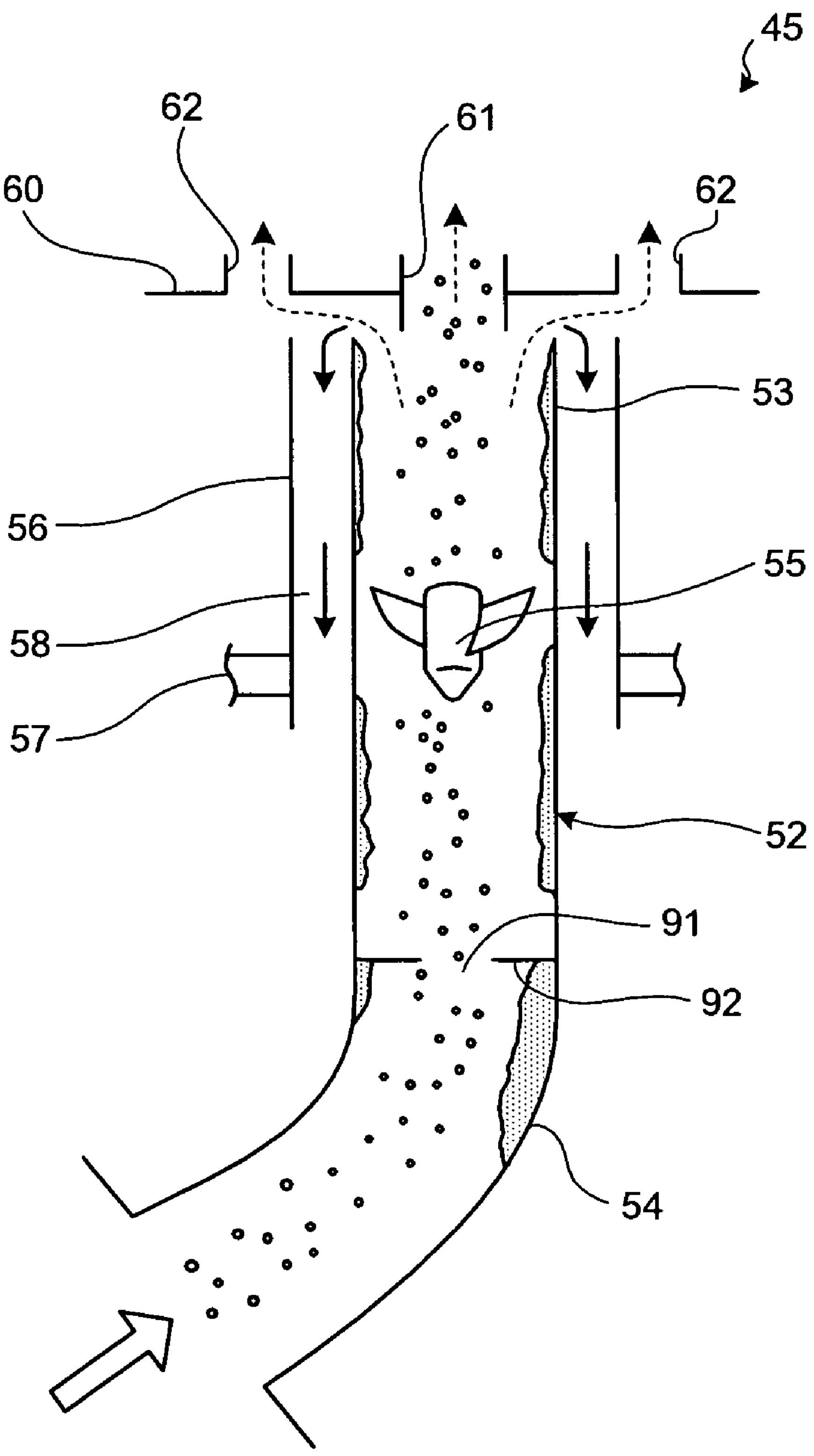
FIG. 8 is a schematic diagram of a relevant part of a steam-water separator according to a fourth embodiment of the present invention.

FIG. 8 is a schematic diagram of a relevant part of a steam-water separator according to a fourth embodiment of the present invention. The member having the same function as that of the member described in the above-mentioned embodiments is given the same reference numeral, and an explanation thereof is omitted.

In the steam-water separator 45 of the fourth embodiment, as shown in FIG. 8, the riser 52 is configured so that the curved part 54 is integrally jointed to the lower part of the vertical part 53, enabling the two-phase flow of the steam and the hot water to be introduced from below the curved part 54, and the riser 52 has the swirl vane 55 fixed inside the vertical part 53. By providing the downcomer barrel 56 to surround the vertical part 53 of the riser 52, the annular downcomer space 58 is formed between the riser 52 and the downcomer barrel 56. The deck plate 60 is provided above the riser 52 and the downcomer barrel 56 with a predetermined space therefrom, and the orifice 61 and the vents 62 are formed on the deck plate 60.

A resistance plate 92 with a two-phase flow passage 91 formed at its center is fixed to the riser 52, as the liquid film adjusting unit, at the location between the curved part 54 and the swirl vane 55.

The operation of the steam-water separator 45 of the present embodiment configured as described above is explained.

The two-phase flow of the steam and the hot water is introduced into the riser 52 from its lower part, flows upward by a whirling power by the swirl vane 55, and is separated into the liquid whose primary element is the hot water and the liquid whose primary element is the steam due to a difference in the whirling radius depending on a difference in mass. The low-mass liquid whose primary element is the steam flows upward inside the riser 52 while whirling with a small whirling radius centered near the central axis of the riser 52, and is discharged above the deck plate 60 through the orifice 61 and the vents 62. On the other hand, the high-mass liquid whose primary element is the hot water flows upward inside the riser 52 while whirling with a whirling radius larger than that of the liquid whose primary element is the steam, and is introduced into the downcomer space 58 of the downcomer barrel 56 through an opening between the riser 52 and the deck plate 60.

At this moment, the two-phase flow of the steam and the hot water introduced into the curved part 54 of the riser 52 comes in contact with the inner face on the outer side of the curving direction of the curved part 54, forming the liquid film there. However, because the resistance plate 92 is fixed above that place and restrains the growth of the liquid film, the liquid film does not increase its thickness. Namely, although the liquid film is formed on the inner face of the riser 52, its flowing upward is blocked by the resistance plate 92, so that the thickness of the liquid film in the circumferential direction at the vertical part 53 of the riser 52 is adjusted to be even. Therefore, the hot water appropriately flows into the downcomer space 58 of the downcomer barrel 56 and flows downward without overflowing through the orifice 61. On the other hand, the steam flows upward while whirling at the upper part of the riser 52 and is appropriately discharged above the deck plate 60 through the orifice 61 without absorbing the water because there is no imbalance of the liquid film.

As above, in the steam-water separator of the fourth embodiment, the swirl vane 55 is fixed inside the riser 52 having the vertical part 53 and the curved part 54, the annular downcomer space 58 is formed by providing the downcomer barrel 56 outside the vertical part 53 of the riser 52, the deck plate 60 is arranged above the riser 52 and the downcomer barrel 56 with a predetermined space therefrom, the orifice 61 and the vents 62 are formed, and the resistance plate 92 with the two-phase flow passage 91 formed at its center is fixed, at the location between the curved part 54 of the riser 52 and the swirl vane 55.

Therefore, although the two-phase flow of the steam and the hot water introduced into the riser 52 comes in contact with the inner face on the outer side of the curving direction of the curved part 54 and the liquid film is formed thereon, the liquid film has its upward flowing blocked by the resistance plate 92, so that the liquid film has its thickness in the circumferential direction at the vertical part 53 of the riser 52 adjusted to be even. Therefore, the hot water appropriately flows into the downcomer space 58 of the downcomer barrel 56 and flows downward without overflowing through the orifice 61. Moreover, there is no imbalance of the liquid film, so that the steam that flows upward while whirling at the upper part of the riser 52 is appropriately discharged above the deck plate 60 through the orifice 61 without absorbing the water. As a result, the steam-water separating efficiency can be enhanced.

In the present embodiment, the liquid film adjusting unit of the present invention is composed by the resistance plate 92 with the two-phase flow passage 91 formed therein. Therefore, it is possible to adjust the thickness of the liquid film formed on the inner face of the vertical part 53 on the outer side of the curving direction and eliminate the discharge of the steam of the two-phase flow going upward inside the riser 52 to the outside with a simple configuration. Thus, enhanced efficiency of the steam-water separating processing can be achieved.

Fifth Embodiment

Figure 9:
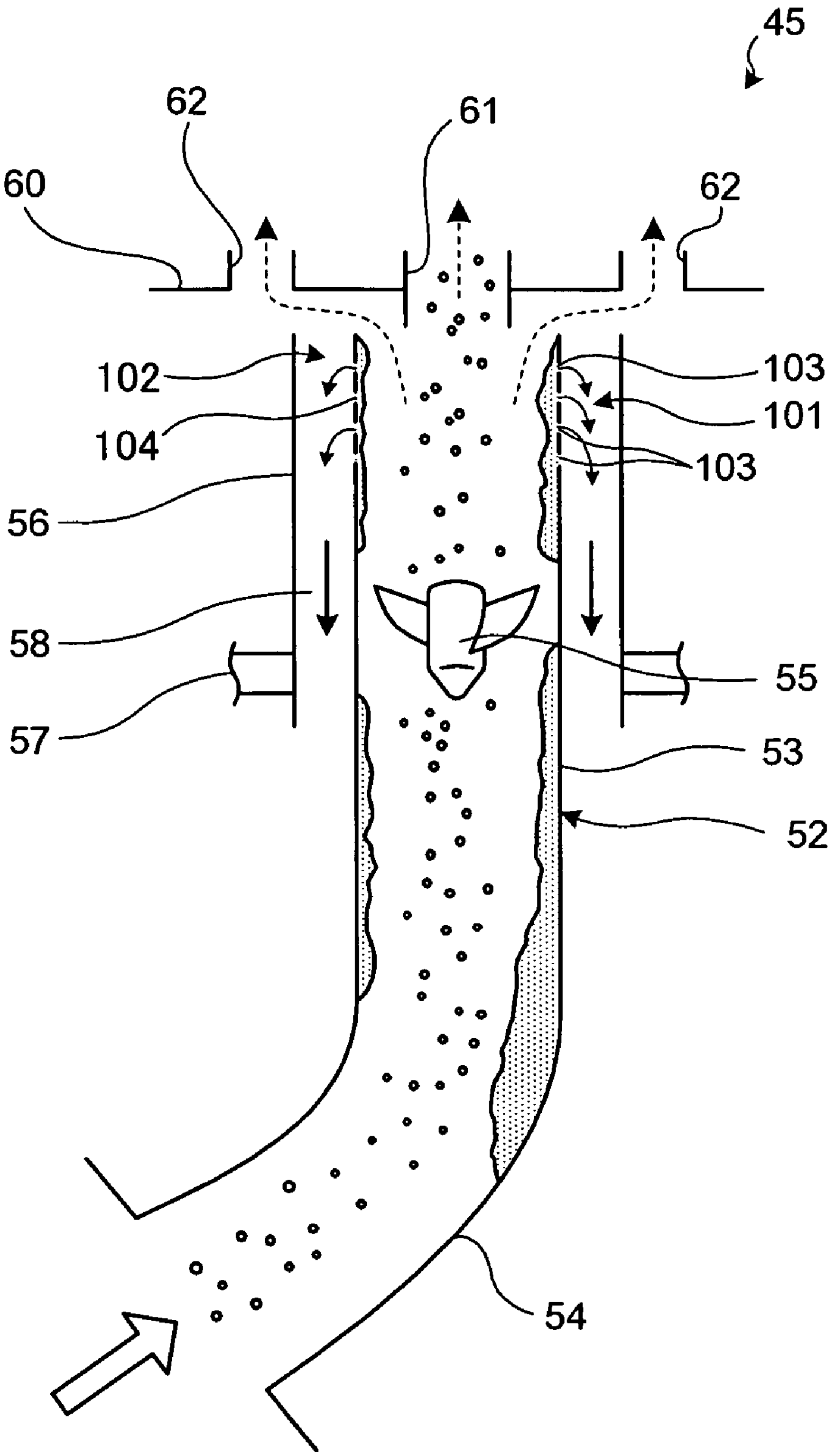
FIG. 9 is a schematic diagram of a relevant part of a steam-water separator according to a fifth embodiment of the present invention.

FIG. 9 is a schematic diagram of a relevant part of a steam-water separator according to a fifth embodiment of the present invention. The member having the same function as that of the member described in the above-mentioned embodiments is given the same reference numeral, and an explanation thereof is omitted.

In the steam-water separator 45 of the fifth embodiment, as shown in FIG. 9, the riser 52 is configured so that the curved part 54 is integrally jointed to the lower part of the vertical part 53, enabling the two-phase flow of the steam and the hot water to be introduced from below the curved part 54, and the riser 52 has the swirl vane 55 fixed inside the vertical part 53. By providing the downcomer barrel 56 to surround the vertical part 53 of the riser 52, the annular downcomer space 58 is formed between the riser 52 and the downcomer barrel 56. The deck plate 60 is provided above the riser 52 and the downcomer barrel 56 with a predetermined space therefrom, and the orifice 61 and the vents 62 are formed on the deck plate 60.

The riser 52 has liquid film flow discharging units 101 and 102 formed, as a liquid film adjusting unit, at the location above the swirl vane 55. The liquid film flow discharging units 101 and 102 are located on the outer side and the inner side of the curving direction of the curved part 54, respectively, and an opening area of the liquid film flow discharging unit 101 is set to be larger than that of the liquid film flow discharging unit 102. In the present embodiment, the liquid film flow discharging units 101 and 102 are composed of a plurality of slits 103 and 104 horizontally formed at the upper end of the vertical part 53, five slits 103 for the liquid film flow discharging unit 101 and three slits 104 for the liquid film flow discharging units 102.

The operation of the steam-water separator 45 of the present embodiment configured as described above is explained.

The two-phase flow of the steam and the hot water is introduced into the riser 52 from its lower part, flows upward by a whirling power by the swirl vane 55, and is separated into the liquid whose primary element is the hot water and the liquid whose primary element is the steam due to a difference in the whirling radius depending on a difference in mass. The low-mass liquid whose primary element is the steam flows upward inside the riser 52 while whirling with a small whirling radius centered near the central axis of the riser 52, and is discharged above the deck plate 60 through the orifice 61 and the vents 62. On the other hand, the high-mass liquid whose primary element is the hot water flows upward inside the riser 52 while whirling with a whirling radius larger than that of the liquid whose primary element is the steam, and is introduced into the downcomer space 58 of the downcomer barrel 56 through an opening between the riser 52 and the deck plate 60.

At this moment, the two-phase flow of the steam and the hot water introduced into the curved part 54 of the riser 52 comes in contact with the inner face on the outer side of the curving direction of the curved part 54, forming the liquid film there Although the liquid film flows upward while its thickness grows even after given a whirling power by the swirl vane 55, because the slits 103 are formed on the upper part of the vertical part 53, some of the liquid film flow is discharged outside through the slits 103. Therefore, the liquid film does not increase its thickness. Namely, although the liquid film is formed on the inner face of the riser 52, the slits 103 and 104 as the liquid film flow discharging units 101 and 102 are formed at the upper end of the vertical part 53, the opening area of the liquid film flow discharging unit 101 located on the outer side of the curving direction of the curved part 54 is set larger than that of the liquid film flow discharging unit 102 located on the inner side of the curving direction of the curved part 54, so that some of the thin liquid film flow formed on the inner side of the curving direction is discharged through the slits 104 and most of the thick liquid film flow formed on the outer side of the curving direction is discharged through the slits 103. For this reason, the thickness of the liquid film in the circumferential direction at the upper part of the vertical part 53 is adjusted to be even, so that the hot water appropriately flows into the downcomer space 58 of the downcomer barrel 56 and flows downward without overflowing through the orifice 61. On the other hand, the steam flows upward while whirling at the upper part of the riser 52 and is appropriately discharged above the deck plate 60 through the orifice 61 without absorbing the water because there is no imbalance of the liquid film.

As above, in the steam-water separator of the fifth embodiment, the swirl vane 55 is fixed inside the riser 52 having the vertical part 53 and the curved part 54, the annular downcomer space 58 is formed by providing the downcomer barrel 56 outside the vertical part 53 of the riser 52, the deck plate 60 is arranged above the riser 52 and the downcomer barrel 56 with a predetermined space therefrom, the orifice 61 and the vents 62 are formed, the slits 103 and 104 as the liquid film flow discharging units 101 and 102 are formed at the location above the swirl vane 55 in the riser 52, and the opening area of the liquid film flow discharging unit 101 located on the outer side of the curving direction of the curved part 54 is set larger than that of the liquid film flow discharging unit 102 located on the inner side of the curving direction of the curved part 54.

Therefore, although the two-phase flow of the steam and the hot water introduced into the riser 52 comes in contact with the inner face on the outer side of the curving direction of the curved part 54 to form the liquid film there, and the liquid film formed flows upward up to the vertical part 53 while growing, most of the thick liquid film flow formed on the outer side of the curving direction is discharged through the slits 103. Therefore, the liquid film has its thickness in the circumferential direction at the upper part of the riser 52 adjusted to be even, so that the hot water appropriately flows into the downcomer space 58 of the downcomer barrel 56 and flows downward without overflowing through the orifice 61. Moreover, there is no imbalance of the liquid film, so that the steam that flows upward while whirling at the upper part of the riser 52 is appropriately discharged above the deck plate 60 through the orifice 61 without absorbing the water. As a result, the steam-water separating efficiency can be enhanced.

Sixth Embodiment

Figure 10:
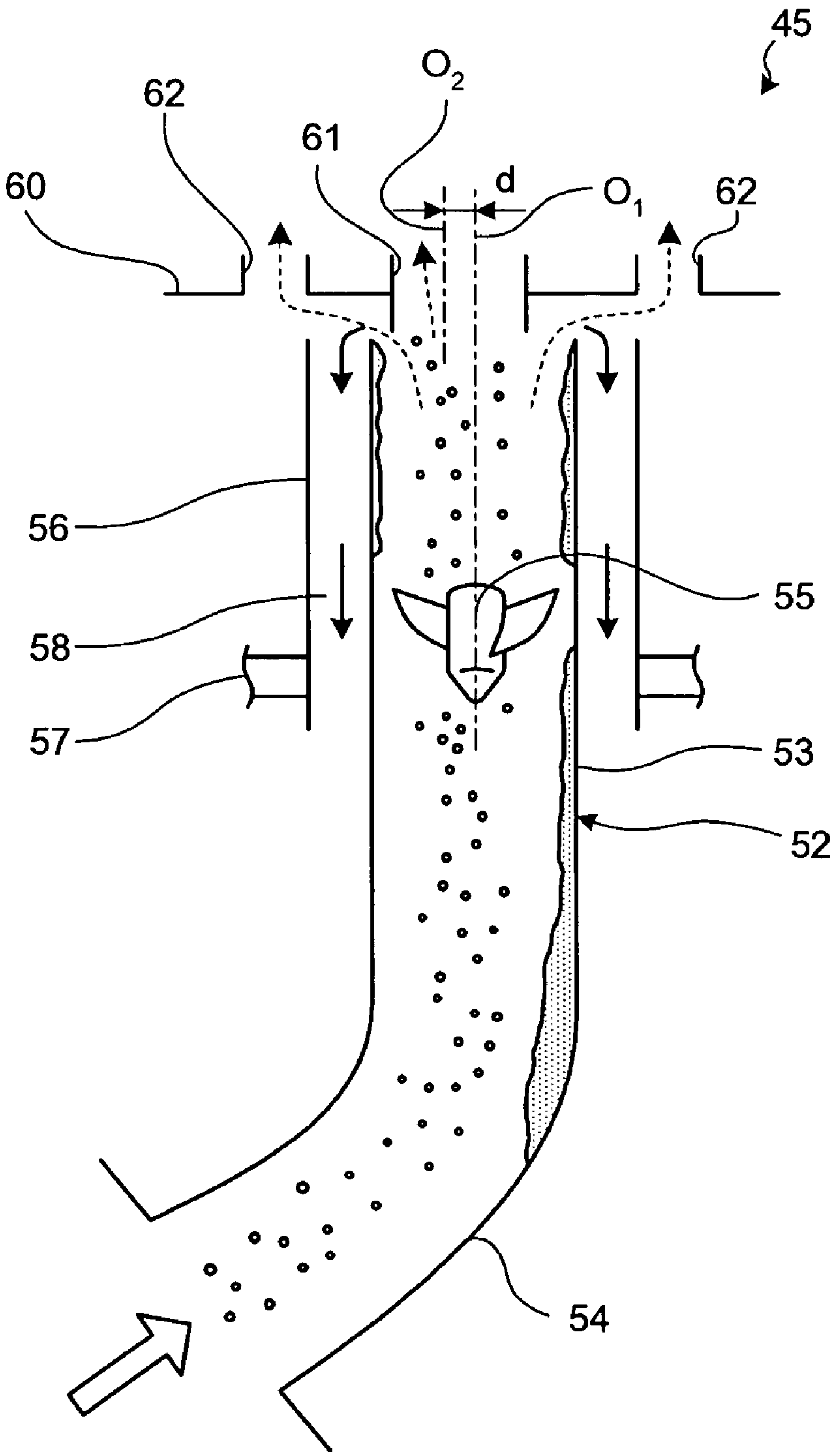
FIG. 10 is a schematic diagram of a relevant part of a steam-water separator according to a sixth embodiment of the present invention.
Figure 11:
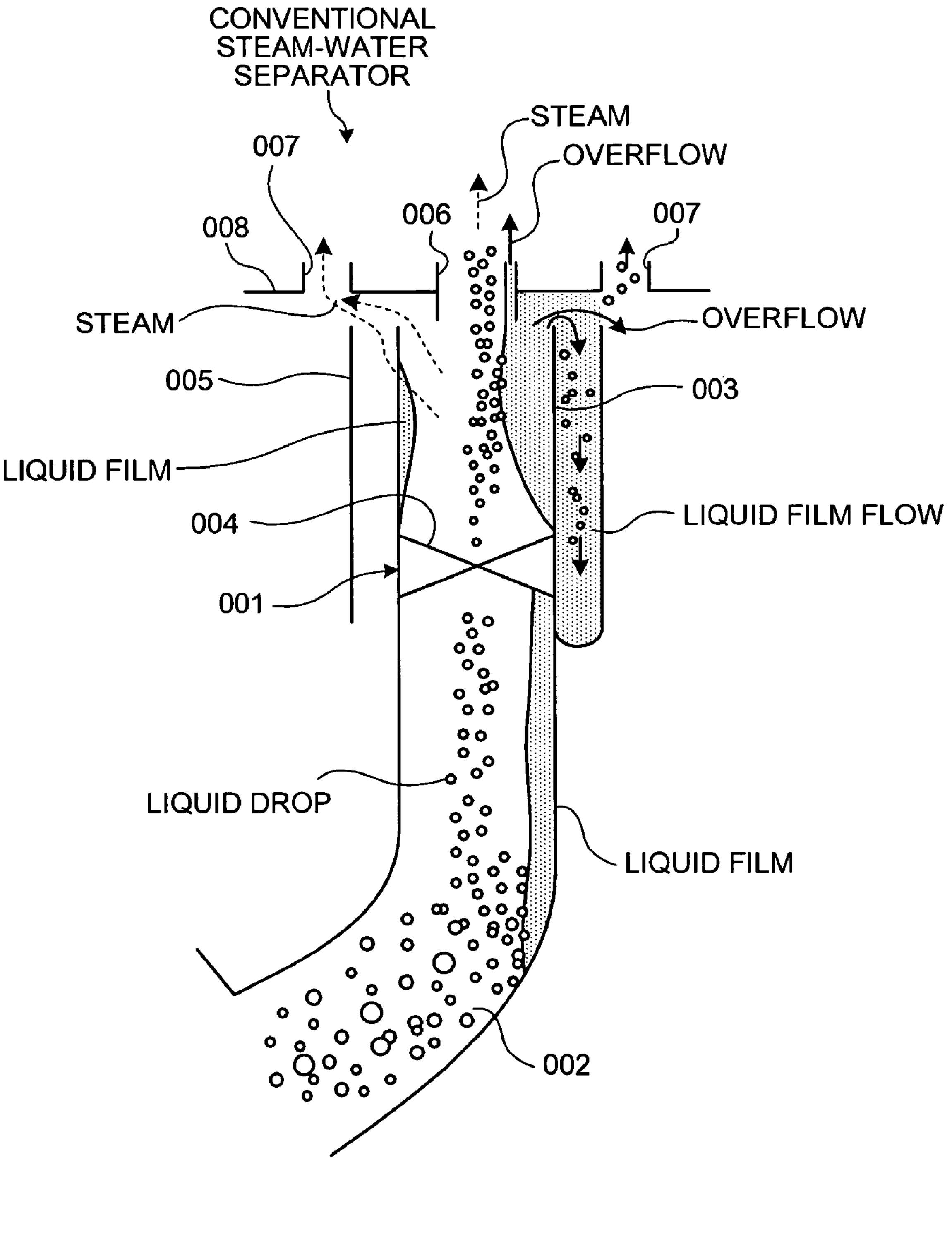
FIG. 11 is a schematic diagram of a conventional steam-water separator.
Figure 12:
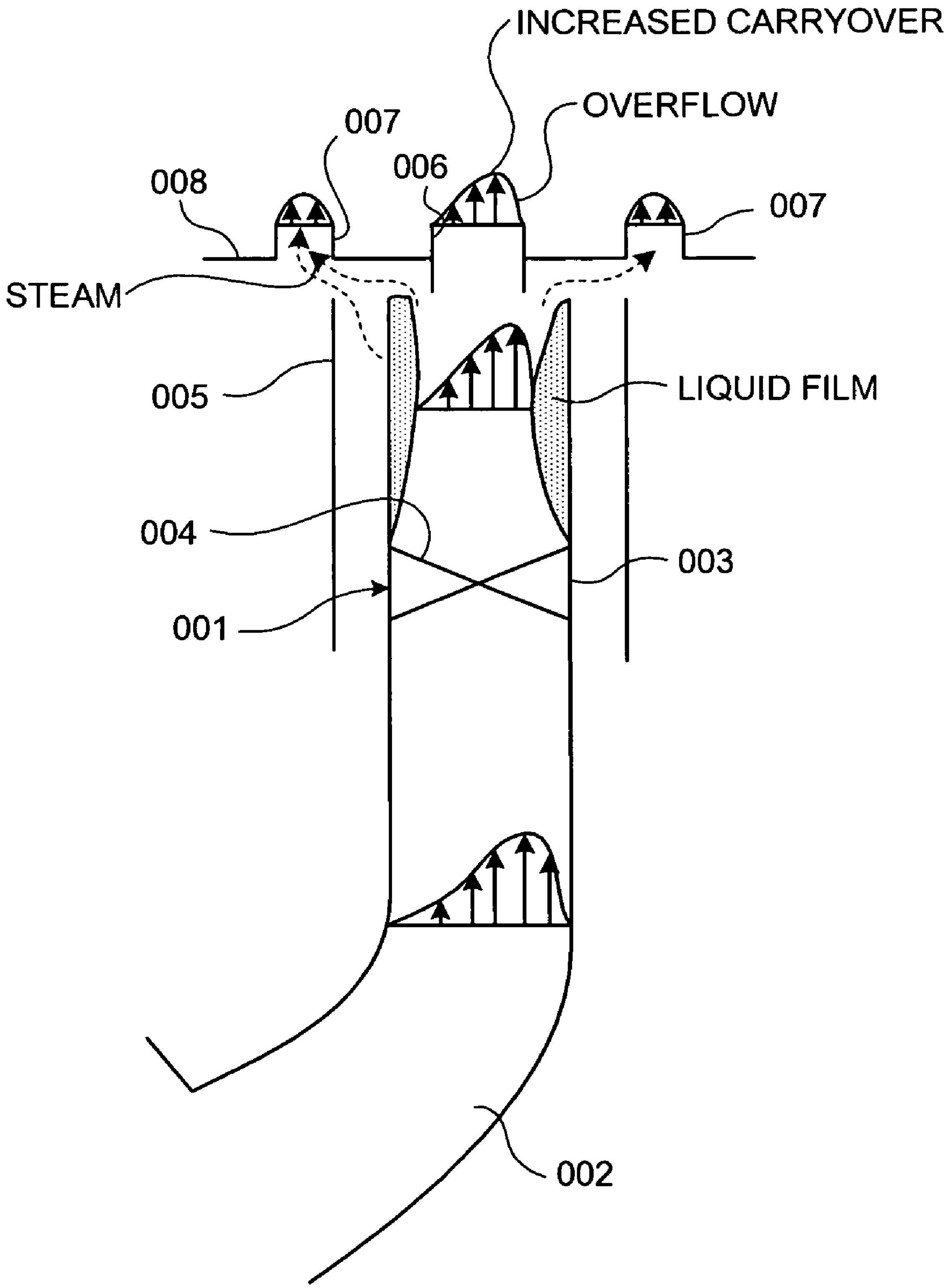
FIG. 12 is a schematic diagram of the conventional steam-water separator.

FIG. 10 is a schematic diagram of a relevant part of a steam-water separator according to a sixth embodiment of the present invention. The member having the same function as that of the member described in the above-mentioned embodiments is given the same reference numeral, and an explanation thereof is omitted.

In the steam-water separator 45 of the sixth embodiment, as shown in FIG. 10, the riser 52 is configured so that the curved part 54 is integrally jointed to the lower part of the vertical part 53, enabling the two-phase flow of the steam and the hot water to be introduced from below the curved part 54, and the riser 52 has the swirl vane 55 fixed inside the vertical part 53. By providing the downcomer barrel 56 to surround the vertical part 53 of the riser 52, the annular downcomer space 58 is formed between the riser 52 and the downcomer barrel 56. The deck plate 60 is provided above the riser 52 and the downcomer barrel 56 with a predetermined space therefrom, and the orifice 61 and the vents 62 are formed on the deck plate 60.

The orifice 61 is provided with its center $O_2$ decentered by a predetermined amount d toward the inner side of the curving direction of the curved part 54, relative to the center $O_1$ of the riser 52.

The operation of the steam-water separator 45 of the present embodiment configured as described above is explained.

The two-phase flow of the steam and the hot water is introduced into the riser 52 from its lower part, flows upward by a whirling power by the swirl vane 55, and is separated into the liquid whose primary element is the hot water and the liquid whose primary element is the steam due to a difference in the whirling radius depending on a difference in mass. The low-mass liquid whose primary element is the steam flows upward inside the riser 52 while whirling with a small whirling radius centered near the central axis of the riser 52, and is discharged above the deck plate 60 through the orifice 61 and the vents 62. On the other hand, the high-mass liquid whose primary element is the hot water flows upward inside the riser 52 while whirling with a whirling radius larger than that of the liquid whose primary element is the steam, and is introduced into the downcomer space 58 of the downcomer barrel 56 through an opening between the riser 52 and the deck plate 60.

At this moment, the two-phase flow of the steam and the hot water introduced into the curved part 54 of the riser 52 comes in contact with the inner face on the outer side of the curving direction of the curved part 54, forming the liquid film there. Although the liquid film flows upward while its thickness grows even after given a whirling power by the swirl vane 55, because the orifice 61 is decentered toward the inner side of the curving direction relative to the riser 52, the liquid film flow does not overflow through the orifice 61. Namely, although the liquid film is formed on the inner face of the riser 52 and grows to above the swirl vane 55, the deck plate 60 is positioned opposite the thick liquid film formed on the outer side of the curving direction in the riser 52 and therefore, the liquid film flow, guided by the deck plate 60, is introduced into the downcomer space 58 of the downcomer barrel 56, without overflowing through the orifice 61.

As above, in the steam-water separator of the sixth embodiment, the swirl vane 55 is fixed inside the riser 52 having the vertical part 53 and the curved part 54, the annular downcomer space 58 is formed by providing the downcomer barrel 56 outside the vertical part 53 of the riser 52, the deck plate 60 is arranged above the riser 52 and the downcomer barrel 56 with a predetermined space therefrom, and the orifice 61 is provided at a position decentered toward the inner side of the curving direction of the curved part 54, relative to the riser 52.

Therefore, although the two-phase flow of the steam and the hot water introduced into the riser 52 comes in contact with the inner face on the outer side of the curving direction of the curved part 54 to form the liquid film there, and the liquid film formed flows upward up to the vertical part 53 while growing, the orifice 61 is formed deviated from the riser 52. Therefore, the thick liquid film formed on the outer side of the curving direction is guided by the deck plate 60, and is introduced into the downcomer space 58 of the downcomer barrel 56. Thus, the overflow of the hot water through the orifice 61 can be prevented.

The orifice 61 is provided at a position decentered relative to the riser 52 toward the inner side of the curving direction of the curved part 54 in the sixth embodiment, which can be applied to the first to fifth embodiments mentioned above.

While, in each embodiment described above, the steam-water separator of the present invention is explained by applying it to the steam-water separator installed in the steam generator of the pressurized water reactor, the present invention is not to be limited to this field but can be applied to the steam-water separator used in other fields.

INDUSTRIAL APPLICABILITY

The steam-water separator according to the present invention enhances the steam-water separating efficiency by making the thickness of the liquid film formed inside the steam-water riser pipe even and preventing the liquid film flow from overflowing, and can be applied to any kind of steam-water separator.

The invention claimed is:

1. A steam-water separator comprising a steam-water riser pipe which includes a curved part at a lower part and through which a two-phase flow of water and steam goes up; a swirl vane provided inside the steam-water riser pipe; a downcomer barrel provided surrounding the steam-water riser pipe to form an annular downcomer space; a deck plate that is arranged opposite upper ends of the steam-water riser pipe and the downcomer barrel with a predetermined space therefrom and that includes an orifice arranged above the steam-water riser pipe; and a liquid film adjusting unit that adjusts a thickness of a liquid film formed on an inner face of the steam-water riser pipe.

2. The steam-water separator of claim 1, wherein the liquid film adjusting unit includes a liquid film flow discharging member arranged on an outer side of a curving direction of the curved part and at a location between the curved part and the swirl vane in the steam-water riser pipe.

3. The steam-water separator of claim 1, wherein the liquid film adjusting unit includes a liquid film flow passage that guides the liquid film formed on an outer side of a curving direction of the curved part to an inner side of the curving direction and arranged at a location between the curved part and the swirl vane in the steam-water riser pipe.

4. The steam-water separator of claim 3, wherein the liquid film flow passage is provided spirally outside the steam-water riser pipe.

5. The steam-water separator of claim 1, wherein the liquid film adjusting unit includes a liquid film flow discharging member arranged on an outer side of a curving direction of the curved part and at a location above the swirl vane in the steam-water riser pipe.

6. The steam-water separator of claim 1, wherein the liquid film adjusting unit includes a resistance plate arranged at a location between the curved part and the swirl vane in the steam-water riser pipe and in which a two-phase flow passage is formed at a center thereof.

7. The steam-water separator of claim 1, wherein the liquid film adjusting unit includes a liquid film flow discharging member provided at an upper end part of the steam-water riser pipe, and an area of opening of the liquid film flow discharging member on an outer side of a curving direction of the curved part is larger than an area of opening on an inner side of the curving direction of the curved part.

8. The steam-water separator of claim 1, wherein the orifice is provided at a position decentered relative to the steam-water riser pipe toward an inner side of the curving direction of the curved part.

9. A steam-water separator comprising a steam-water riser pipe which includes a curved part at a lower part and through which a two-phase flow of water and steam goes up; a swirl vane provided inside the steam-water riser pipe; a downcomer barrel provided surrounding the steam-water riser pipe to form an annular downcomer space; and a deck plate that is arranged opposite the upper ends of the steam-water riser pipe and the downcomer barrel with a predetermined space therefrom and that includes an orifice above the steam-water riser pipe, wherein the orifice is arranged at a position decentered relative to the steam-water riser pipe toward an inner side of a curving direction of the curved part.

* * * * *